US012592964B2

(12) United States Patent
Pretli

(10) Patent No.: US 12,592,964 B2
(45) Date of Patent: Mar. 31, 2026

(54) SYSTEMS AND METHODS FOR EFFICIENTLY PROCESSING COMMUNICATIONS FOR MALICIOUS HYPERLINKS

(71) Applicant: Fortinet, Inc., Sunnyvale, CA (US)

(72) Inventor: Jochen Pretli, Waghaeusel (DE)

(73) Assignee: Fortinet, Inc., Sunnyvale, CA (US)

( * ) Notice: Subject to any disclaimer, the term of this patent is extended or adjusted under 35 U.S.C. 154(b) by 245 days.

(21) Appl. No.: 18/238,770

(22) Filed: Aug. 28, 2023

(65) Prior Publication Data

US 2025/0080576 A1 Mar. 6, 2025

(51) Int. Cl.
*H04L 9/40* (2022.01)

(52) U.S. Cl.
CPC ...... *H04L 63/1483* (2013.01); *H04L 63/1416* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 11,595,437 | B1 * | 2/2023 | Mushtaq | H04L 63/20 |
| 11,997,115 | B1 * | 5/2024 | Higbee | G06F 16/35 |
| 2013/0333028 | A1 * | 12/2013 | Hagar | H04L 63/1483 |
| | | | | 726/22 |
| 2018/0063168 | A1 * | 3/2018 | Sofka | G06N 3/0895 |
| 2023/0259625 | A1 * | 8/2023 | Gechman | G06N 20/20 |
| | | | | 726/23 |
| 2023/0283634 | A1 * | 9/2023 | Kwatra | G06N 3/008 |
| | | | | 726/23 |

FOREIGN PATENT DOCUMENTS

| | | | | | |
|---|---|---|---|---|---|
| CN | 116400989 | A * | 7/2023 | | G06F 9/454 |
| EP | 3128449 | B1 * | 12/2018 | | G06F 16/951 |
| EP | 3716575 | A1 * | 9/2020 | | H04L 63/1483 |
| WO | WO-2023028596 | A1 * | 3/2023 | | G06F 16/9558 |

* cited by examiner

*Primary Examiner* — Sakinah White-Taylor

(74) *Attorney, Agent, or Firm* — Law Office of Dorian Cartwright; Dorian Cartwright

(57) ABSTRACT

Systems, devices, and methods are discussed for mitigating security threats due to web-domain characteristic changes.

21 Claims, 6 Drawing Sheets

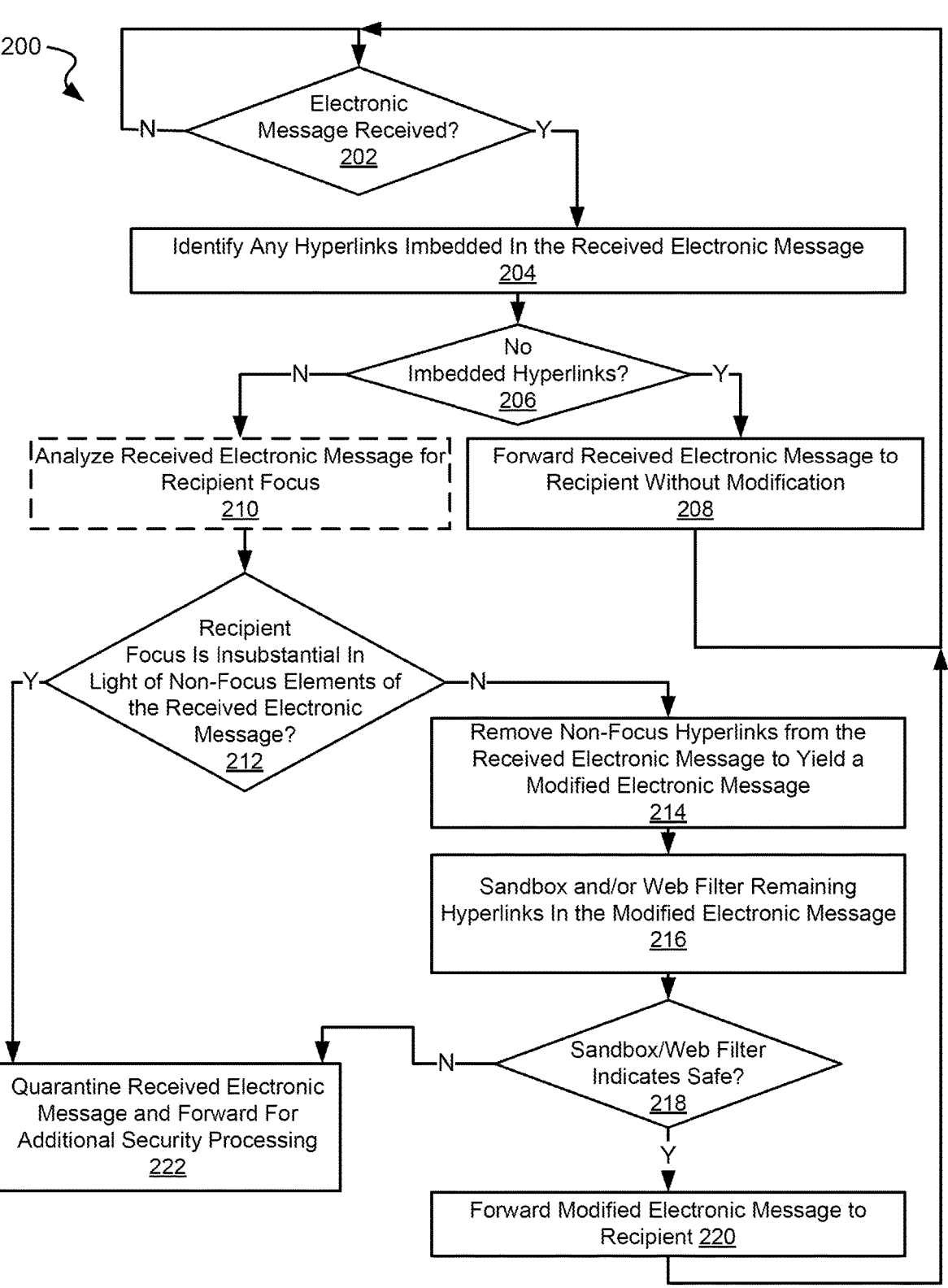

200

Electronic Message Received?
202
—N
—Y

Identify Any Hyperlinks Imbedded In the Received Electronic Message
204

No Imbedded Hyperlinks?
206
—N
—Y

Analyze Received Electronic Message for Recipient Focus
210

Forward Received Electronic Message to Recipient Without Modification
208

Recipient Focus Is Insubstantial In Light of Non-Focus Elements of the Received Electronic Message?
212
Y—
—N Remove Non-Focus Hyperlinks from the Received Electronic Message to Yield a Modified Electronic Message
214

Sandbox and/or Web Filter Remaining Hyperlinks In the Modified Electronic Message
216

Sandbox/Web Filter Indicates Safe?
218
—N
Y

Quarantine Received Electronic Message and Forward For Additional Security Processing
222

Forward Modified Electronic Message to Recipient 220

SYSTEMS AND METHODS FOR EFFICIENTLY PROCESSING COMMUNICATIONS FOR MALICIOUS HYPERLINKS

COPYRIGHT NOTICE

FIELD

Embodiments discussed generally relate to performing web filtering by a security application, and more particularly to systems and methods for efficiently processing communications for malicious hyperlinks.

BACKGROUND

Processing electronic communications may include scrutinizing hyperlinks included in the communications. This may include, for example, serially scrutinizing each hyperlink to assure it directs a communication recipient to a benign website. This process can take considerable time leaving a Hobson's choice of adding an unacceptable delay in communications or allowing one or more un-scrutinized hyperlinks through the security screen. In a highly secured system, the security rule may be set to assure that all hyperlinks are fully scrutinized before a communication is allowed through the security screen. In such a system an electronic communication could possibly be delayed for days depending upon any backlog of hyperlinks to be screened. On the other end of the spectrum, electronic communications could be assure within a short period of time, such that in many cases a malicious hyperlink will make it through the security screen as any scrutiny may be eliminated to assure compliance with a latency requirement. Many systems try to balance latency verses security, but the balance is rarely ideal.

Thus, there exists a need in the art for more advanced approaches, devices and systems for efficiently processing electronic communications.

SUMMARY

Various embodiments provide systems and methods for efficiently processing communications for malicious hyperlinks.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar

Figure 1A:
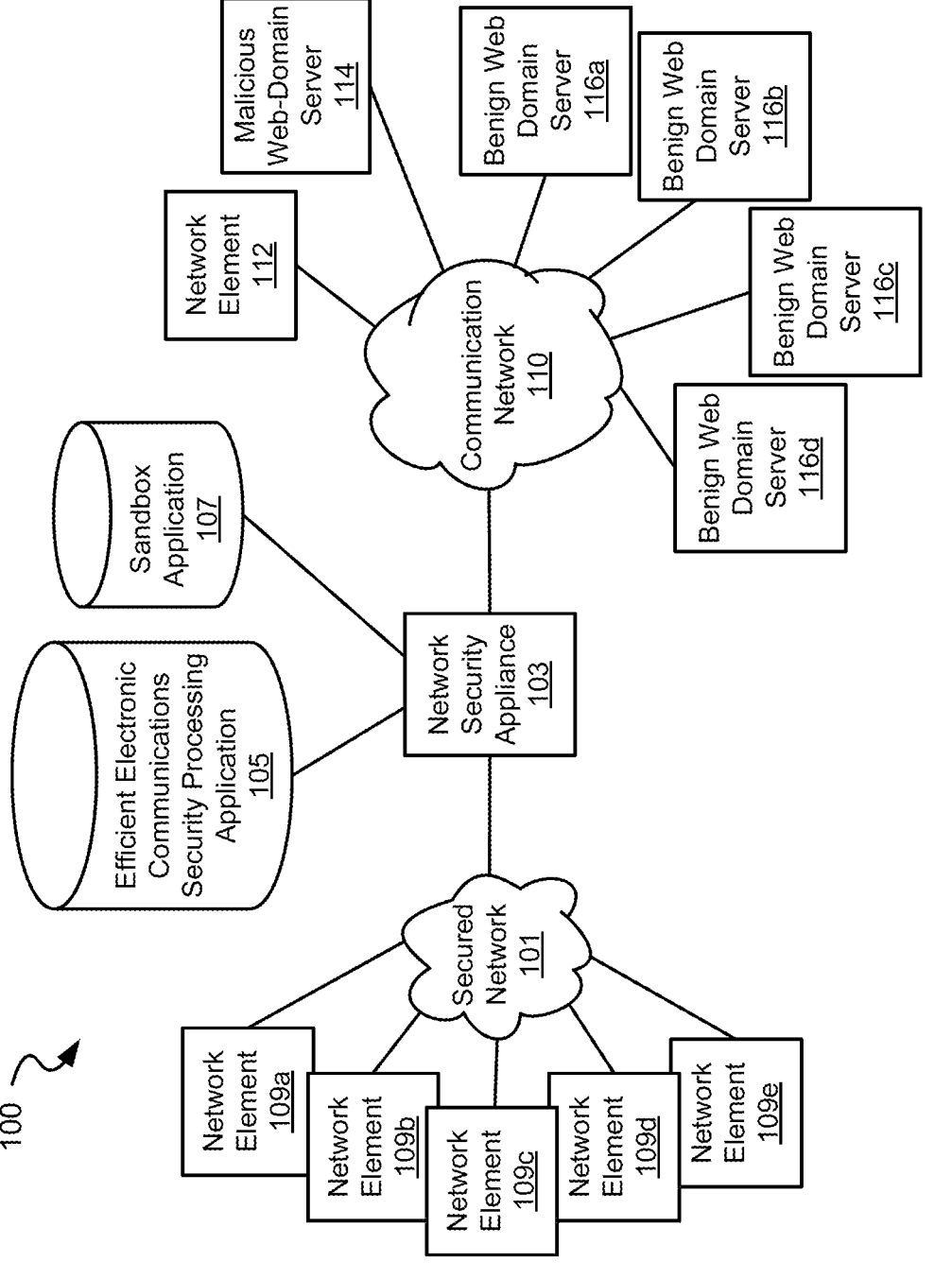

2 components. When reference is made to a reference numeral without specification to an existing sub-label, it is intended to refer to all such multiple similar components.

Figure 1B:
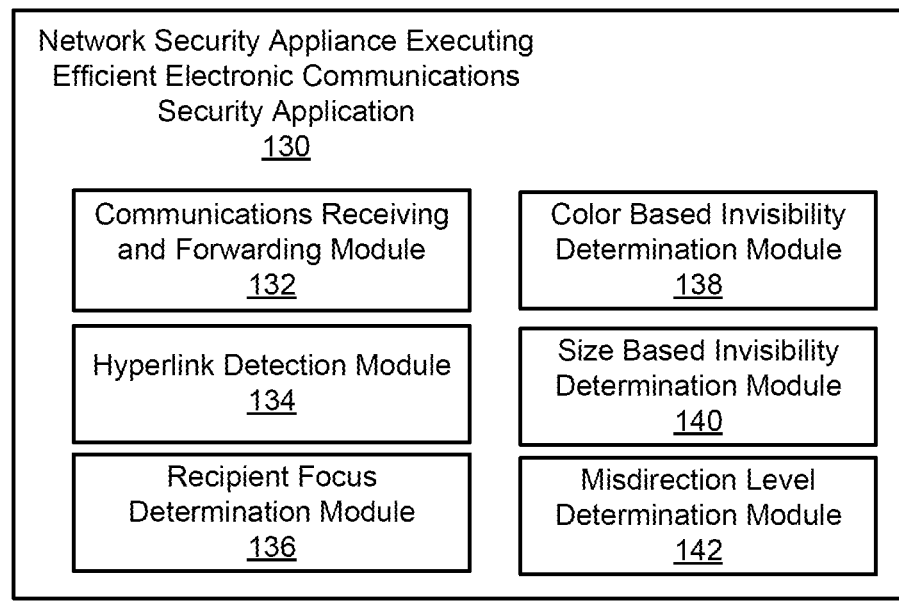
Figure 1C:
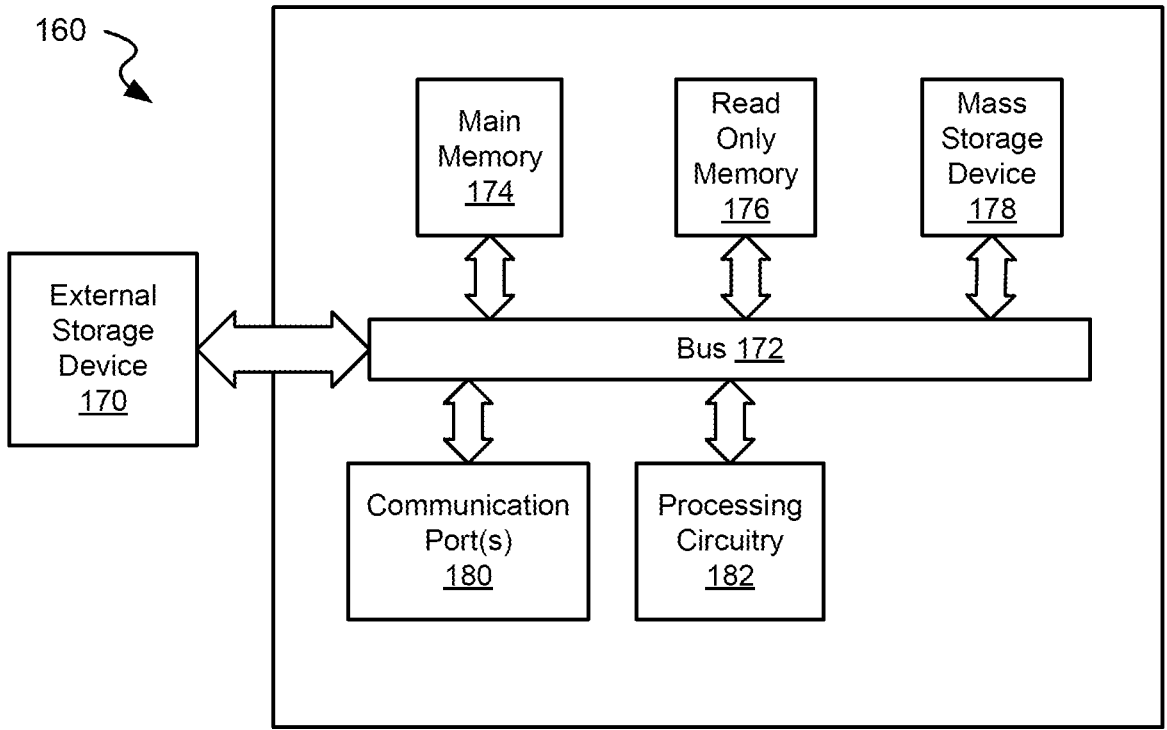
Figure 3A:
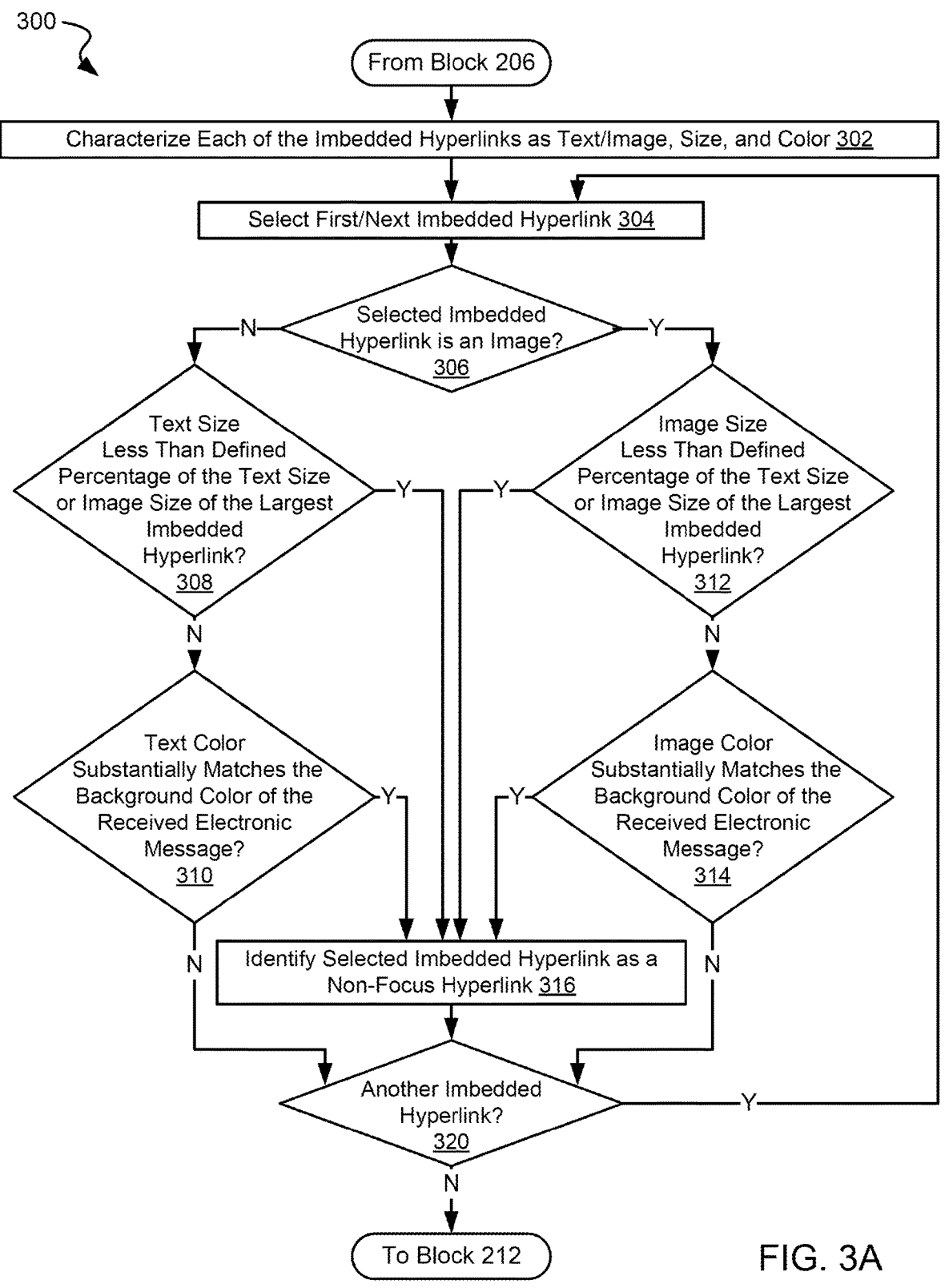
Figure 3B:
Figure 4:
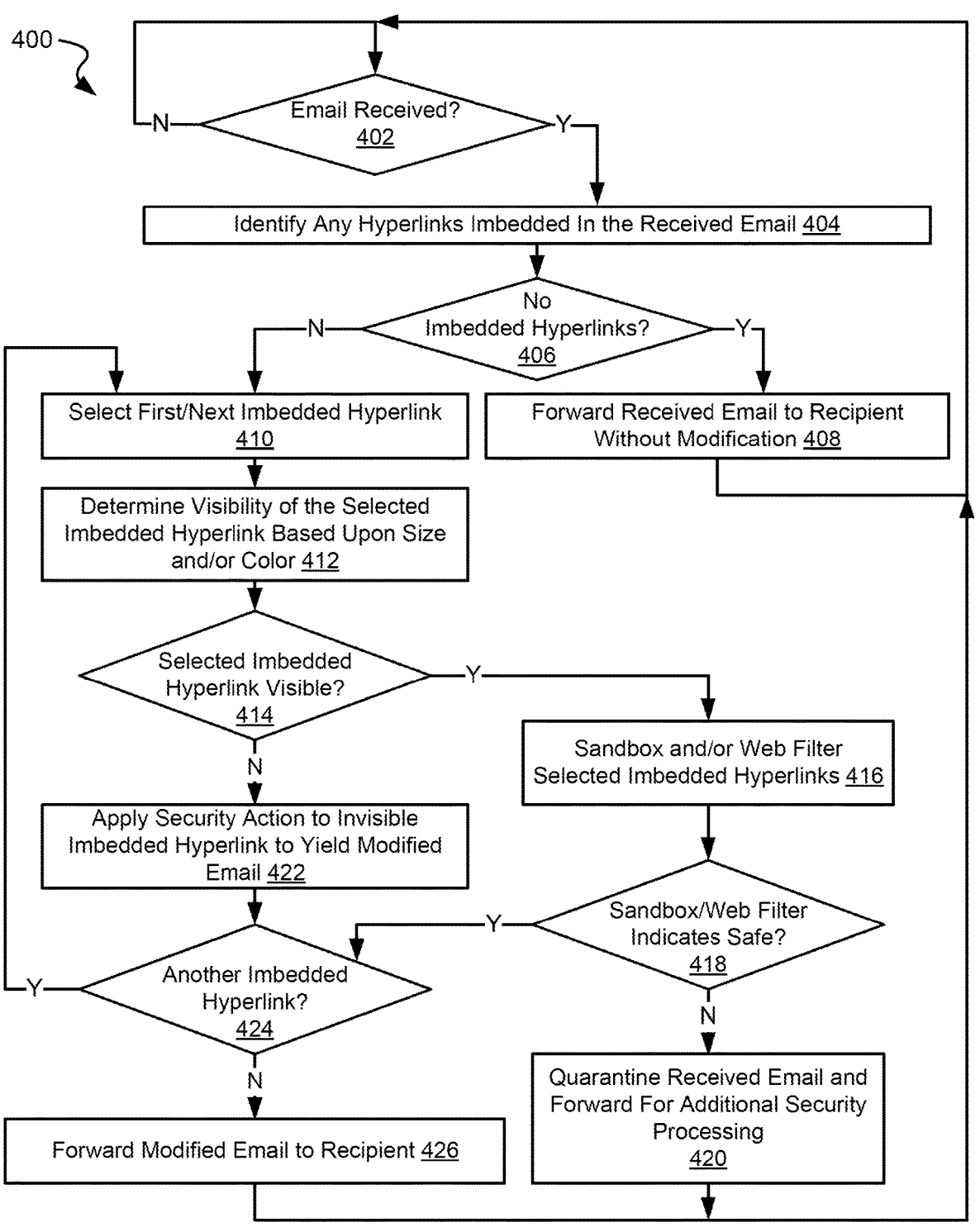

FIGS. 1A-1C illustrate a network architecture having a network security appliance executing an efficient electronic communication security processing application is shown in accordance with various embodiments;

FIG. 2 is a flow diagram shows a method in accordance with various embodiments for efficiently applying security processing to electronic communications including one or more hyperlinks;

FIGS. 3A-3B are flow diagrams showing alternative methods in accordance with various embodiments for identifying one or more hyperlinks imbedded in an electronic communication as not part of a recipient's focus of the electronic communication; and FIG. 4 is a flow diagram shows a method in accordance with various embodiments for efficiently applying security processing to a received email that includes one or more hyperlinks.

DETAILED DESCRIPTION

Various embodiments provide systems and methods for efficiently processing communications for malicious hyperlinks.

In some cases a tradeoff has been made that allows only twelve hyperlinks within an electronic communication to be processed for security problems. The twelve hyperlinks are accessed in sequential order from the electronic communication. Where any of the twelve hyperlinks is identified as being associated with a malicious website, the received electronic communication can be quarantined and thus limit the recipient's potential for accessing the website.

While not seen yet, it would possible for a malicious actor to include twelve or more hyperlinks associated benign websites followed by one or more hyperlinks associated with a malicious website. Such an approach would sidestep the security processing as the thirteenth or later hyperlink is not considered. Such an approach could be augmented by making the initial hyperlinks either invisible or in some other way not the focus of a recipient's attention, while the hyperlink associated with the malicious website is the focus of the recipient's attention. In such a case, not only would the hyperlink associated with the malicious website avoid scrutiny by being the thirteenth or later hyperlink in the electronic communication, it would also be the hyperlink most likely to be selected by the recipient. Such an approach of adding a number of hyperlinks associated with benign websites to avoid scrutiny of a hyperlink associated with a malicious website coupled with rendering the hyperlink associated with the malicious website in a way that catches the attention of the recipient over the benign hyperlinks makes it possible for a malicious actor to ad hundreds of more benign hyperlinks in an electronic communication. This would make a simple increase in the number of scrutinized websites not only increase the processing bandwidth dedicated to scrutinizing websites associated with hyperlinks, the increase in processing bandwidth would ultimately be a futile act in the effort to avoid the propagation of hyperlinks directed at malicious websites.

To address this potential threat, some embodiments discussed herein operate to identify the focus of the electronic communication from the perspective of the recipient, and then scrutinizes any hyperlinks that are determined to be part of this focus. Any other hyperlinks that are determined to be outside of the recipient's focus may be rendered inoperable in any form of the electronic communication that is forwarded to the recipient. In this way, only those hyperlinks that are considered to be part of the recipient's focus are scrutinized, and all other hyperlinks are rendered inoperable. This allows for processing an electronic communication that includes many diversionary hyperlinks associated with benign websites and other hyperlinks to which the recipient is focused both more efficiently and more effectively than systems reliant upon scrutinizing either a defined number of hyperlinks or every hyperlink for association with a malicious website.

Embodiments of the present disclosure include various processes, which will be described below. The processes may be performed by hardware components or may be embodied in machine-executable instructions, which may be used to cause a general-purpose or special-purpose processor programmed with the instructions to perform portions of the processes. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", "network device", or "network element" generally refers to a device or appliance in virtual or physical form that is operable to perform one or more network and/or endpoint functions. In some cases, a network appliance may be a database, a network server, computer, mobile phone, or the like. Some network elements may be implemented as general-purpose computers or servers with appropriate software operable to perform the one or more network functions. Other network elements may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance", "network security device", or a "network security element" that may reside within the particular network that it is protecting or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DOS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "non-focus" hyperlink is used in its broadest sense to mean a hyperlink imbedded in an electronic message that is less likely to attract the focus of a recipient of the electronic message than another hyperlink in the message. As an example, a non-focus hyperlink may be invisible to the recipient because either it is too small or the same color as the background of the electronic message. As another example, a non-focus hyperlink may be somewhat visible, but relatively small compared to another hyperlink in the electronic message. As another example, a non-focus hyperlink may be somewhat visible, but substantially the same color as the background of the electronic message. Based upon the disclosure provided herein, one of ordinary skill in the art will recognize a variety of non-focus hyperlinks that are possible in accordance with different inventions.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods that include: identifying, by a processing resource, a set of hyperlinks in a received electronic message; automatically determining, by the processing resource, that a first hyperlink in the set of hyperlinks is a non-focus hyperlink; and applying, by the processing resource, a security process to a second hyperlink in the set of hyperlinks to determine whether the second hyperlink is associated with a malicious website. In various instances of the aforementioned embodiments, the electronic message is an email or a text message.

In some instances of the aforementioned embodiments, the methods further include forwarding, by the processing resource, the modified electronic message to a recipient based at least in part upon a determination that the second hyperlink is not associated with a malicious website. In various instances of the aforementioned embodiments, the methods further include rejecting, by the processing resource, the modified electronic message based at least in part upon a determination that the second hyperlink is associated with a malicious website. In some instances of the aforementioned embodiments, the methods further include rejecting, by the processing resource, the received electronic message when a characteristic of the electronic message is determined. The characteristic is one of: a total number of hyperlinks included in the set of hyperlinks exceeds a defined threshold; or a ratio of a number of hyperlinks determined to be non-focus hyperlinks to the total number of hyperlinks included in the set of hyperlinks exceeds a defined ratio.

In some instances of the aforementioned embodiments, applying the security process to the second hyperlink includes performing a web filter process where a uniform record locator associated with the second hyperlink is compared with a plurality of known malicious websites. In some such instances where the web filter process indicates that the second hyperlink is safe, applying the security process to the second hyperlink further includes applying a sandbox process to the second hyperlink that accesses a website associated with the second hyperlink to determine a malicious status of the website.

In various instances of the aforementioned embodiments, the determining that the first hyperlink in the set of hyperlinks is a non-focus hyperlink includes: determining, by the processing resource, a size of the first hyperlink; comparing, by the processing resource, the size of the first hyperlink with a defined size; and identifying, by the processing resource, the first hyperlink as a non-focus hyperlink when the size of the first hyperlink is less than the defined size. In some such instances the first hyperlink is represented as text, and the size of the first hyperlink is a font size of one character of the first hyperlink. In other instances the first hyperlink is represented as an image, and the size of the first hyperlink is a number of pixels squares of the image.

In some instances of the aforementioned embodiments, determining that the first hyperlink in the set of hyperlinks is a non-focus hyperlink includes: determining, by the processing resource, a color of the first hyperlink; comparing, by the processing resource, the color of the first hyperlink with a background color of the received electronic message; and identifying, by the processing resource, the first hyperlink as a non-focus hyperlink when the color of the first hyperlink is less than twenty percent different that the background color of the received electronic message.

In various instances of the aforementioned embodiments, determining that the first hyperlink in the set of hyperlinks is a non-focus hyperlink includes: determining, by the processing resource, a size of the first hyperlink and a maximum size of any hyperlink in the set of hyperlinks; comparing, by the processing resource, the size of the first hyperlink with the maximum size of any hyperlink in the set of hyperlinks; and identifying, by the processing resource, the first hyperlink as a non-focus hyperlink when the size of the first hyperlink is less than a defined ratio of the first hyperlink to the maximum size. In some such instances, the defined threshold is less than 0.4.

Other embodiments provide non-transitory computer-readable storage media embodying a set of instructions, which when executed by a processing resource, causes the processing resource to: identify a set of hyperlinks in a received electronic message; automatically determine that a first hyperlink in the set of hyperlinks is a non-focus hyperlink; and apply a security process to a second hyperlink in the set of hyperlinks to determine whether the second hyperlink is associated with a malicious website.

Yet other embodiments systems for performing network security. The systems include: a processing resource; and a non-transitory computer-readable medium, coupled to the processing resource. The non-transitory computer-readable medium has stored therein instructions that when executed by the processing resource cause the processing resource to: identify a set of hyperlinks in a received electronic message; automatically determine that a first hyperlink in the set of hyperlinks is a non-focus hyperlink; and apply a security process to a second hyperlink in the set of hyperlinks to determine whether the second hyperlink is associated with a malicious website.

Turning to FIG. 1A, a network architecture 100 is shown in accordance with some embodiments that includes a network security appliance 103 executing an efficient electronic communication security processing application 105. Network security appliance 103 protects a secured network 101. Secured network 101 may be any type of network known in the art. Thus, secured network 101 may be, but is not limited to, a wireless network, a wired network or a combination thereof that can be implemented as one of the various types of networks, such as the Internet, an Intranet, a Local Area Network (LAN), a Wide Area Network (WAN), and the like.

Secured network 101 provides for inter-network communications between network elements 109 (i.e., a network element 109a, a network element 109b, a network element 109c, a network element 109d, and/or network element 109e), and for extra-network communications between network elements 109 and other network elements outside of secured network 101 (e.g., a network element 112, a malicious web-domain server 114, a benign web-domain server 116a, a benign web-domain server 116b, a benign web-domain server 116d, and/or a benign web-domain server 116d.

Network security appliance 103 operates as a gateway between secured network 103 and outside networks (e.g., a communication network 110). Communication network 110 may be any type of network known in the art. Thus, communication network 110 may be, but is not limited to, a wireless network, a wired network or a combination thereof that can be implemented as one of the various types of networks, such as the Internet, an Intranet, a Local Area Network (LAN), a Wide Area Network (WAN), and the like. Network security appliance 103 provides for communications between network elements 109 and various benign web-domain servers 116, a malicious web-domain server 114, and/or a network element 112 via communication network 110.

As an example operation, a malicious actor may use network element 112 to send an electronic message to one or more of network elements 109. The electronic message may be any electronic message known in the art including, but not limited to, an email or a text message. Based upon the disclosure provided herein, one of ordinary skill in the art will recognize a variety of electronic messages that may be processed in accordance with embodiments discussed herein.

The electronic message may include, one or more hyperlinks that, when selected by a recipient, cause the recipient's device to be directed to an associated website (e.g., malicious web-domain server 114, or one of benign web-domain servers 116). The intent of including a hyperlink directing the recipient's device to a malicious website is to allow a malicious download from, for example, malicious web-domain server 114 to the recipient's device and/or to encourage the recipient to engage in a behavior contrary to their best interest.

As the electronic message transits toward the recipient (e.g., one or more of network elements 109), it is accessed and scrutinized by network security appliance 103. Network security appliance 103 executes instructions included an efficient electronic communication security processing application 105 that cause network security appliance 103 to: identify any hyperlinks imbedded in the electronic message, forward the electronic message without modification where no hyperlinks are identified, analyze which if any of the included hyperlinks are rendered in a way to capture the recipient's focus, render inoperable any hyperlinks that are not rendered in a way to capture the recipient's focus, and scrutinize any hyperlinks that are rendered in a way to capture the recipient's focus. The scrutinizing of the hyperlinks that are rendered in a way to capture the recipient's focus may include querying a website database (not shown) to determine whether the website associated with a scrutinized hyperlink is a known malicious website and/or executing a sandbox application 107 that causes access to the website associated with the scrutinized hyperlink to be accessed in a secure manner and subsequently processed to identify any potential threats. Any process known in the art for executing in an sandbox and/or querying a hyperlink against a list of known malicious websites may be used in relation to different embodiments.

Where the scrutiny of the hyperlinks that are rendered in a way to capture the recipient's focus reveals that the websites are all associated with benign websites (i.e., non-malicious websites), the electronic message is forwarded to the intended recipient with any hyperlinks that are not rendered in a way to capture the recipient's focus rendered inoperable. In contrast, where the scrutiny of the hyperlinks that are rendered in a way to capture the recipient's focus reveals that the any of the websites are associated with a malicious website, the electronic message is quarantined and subjected to further security processing in accordance with a defined security protocol. The quarantining and/or other processing of an electronic message identified as including a hyperlink to a malicious website may be done in accordance with any approach known in the art.

Turning to FIG. 1B, an example implementation of a network security appliance executing an efficient electronic communication security processing application 130 (e.g., network security appliance 103 executing efficient electronic communication security processing application 105). As shown, network security appliance executing an efficient electronic communication security processing application 130 includes: a communications receiving and forwarding module 132, a hyperlink detection module 134, a recipient focus determination module 136, a color based invisibility determination module 138, a size based invisibility determination module 140, and a misdirection level determination module 142.

Communications receiving and forwarding module 132 is configured to receive an electronic message, and after processing to forward the electronic communication to a recipient in either a modified or unmodified form. Hyperlink detection module 134 is configured to identify any hyperlinks imbedded in a received electronic message. Any identified hyperlinks are assembled into a set of hyperlinks for processing. Recipient focus determination module 136 is configured to determine which if any of the hyperlinks included in the set of hyperlinks are non-focus hyperlinks. As more fully discussed below, a non-focus hyperlink is one that is unlikely to be selected by a recipient either because its size makes it less likely to be selected over another larger hyperlink or difficult or impossible for the recipient to see, and/or the color of the hyperlink makes it difficult or impossible for the recipient to see. Color based invisibility determination module 138 is configured to determine whether a selected hyperlink is a non-focus hyperlink based upon color. Size based invisibility determination module 140 is configured to determine whether a selected hyperlink is a non-focus hyperlink based upon size.

Misdirection level determination module 142 is configured to determine whether the electronic message includes so many non-focus hyperlinks relative to the total number of hyperlinks and/or so many hyperlinks altogether such that the electronic message is considered to be using misdirection to avoid detection of a hyperlink associated with a malicious website.

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In some cases, computer system 160 may be used to implement all or part of network security appliance 103, and/or one or more of network elements 109, network element 112, malicious web-domain server 114, or benign web-domain servers 116.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 170 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer system limit the scope of the present disclosure.

Turning to FIG. 2, a flow diagram 200 shows a method in accordance with various embodiments for efficiently applying security processing to electronic communications including one or more hyperlinks. Following flow diagram 200, it is determined whether an electronic message has been received (block 202). This determination may be made by any approach known in the art. For example, where the method is to be applied to email messages, a determination as to whether an electronic message has been received may include, but is not limited to, identifying features in a received network communication that are indicative of an email such as, for example, use of the @ sign. As another example, where the method is to be applied to text messages, a determination as to whether an electronic message has been received may include, but is not limited to, identifying features in a received network communication that are indicative of a text message such as, for example, use of an SMS protocol. Of note, systems in accordance with some embodiments may operate upon multiple types of electronic messages. Based upon the disclosure provided herein, one of ordinary skill in the art will recognize a variety of approaches that may be used to determine that an electronic message has been received.

Where an electronic message has been received (block 202), the received electronic message is parsed to identify any imbedded hyperlinks (block 204). Any approach known in the art for identifying an imbedded hyperlink may be used in accordance with different embodiments. As an example, the electronic message may be parsed to identify one of more of the terms "href", "http:", or "https:". Where the term is found, the uniform record locator ("URL") associated therewith is stored as a hyperlink. Thus, for example, where an electronic message includes the following:

Standard hyperlink: <a href=https://www.fortinet.com>The Fortinet website</a>, the www.fortinet.com is stored as a hyperlink. In some embodiments, identifying the hyperlinks is done using Forti-Mail™. In some cases, the hyperlinks may include a URL that is directed to a website that does not exist. Examples of such "null" hyperlinks follow:

null-string hyperlink: <a href=https://www.fortinet-.com></a>or
<a href="https://"></a>.

Such "null" hyperlinks may be used by a malicious actor to force a security program to scrutinize meaningless hyperlinks in an effort to avoid scrutiny of a malicious hyperlink found later in the received electronic message as described above. Based upon the disclosure provided herein, one of ordinary skill in the art will recognize a variety of approaches that may be used in relation to different embodiments to identify hyperlinks in a received electronic message.

It is determined whether no hyperlinks (i.e., zero hyperlinks) were identified in the received electronic message (block 206). Where no hyperlinks were identified (block 206), the electronic message is forwarded to the identified recipient without modification (block 208). It is noted that in some cases, instead of forwarding the electronic message, it may be subject to other security processing in accordance with established security processing rules for the particular type of electronic message.

Alternatively, where at least one hyperlink was identified (block 206), the received electronic message is analyzed for recipient focus (block 210). Block 210 is shown in dashed lines as one embodiment of it is shown in FIG. 3. Turning to FIG. 3A, a flow diagram 300 shows a method in accordance with some embodiments for identifying one or more hyperlinks imbedded in an electronic communication as not part of a recipient's focus of the electronic communication of the electronic message. Following flow diagram 300, each of the hyperlinks identified in block 204 is characterized as: either text or image, size, and color (block 302). In addition, a background color of the electronic message is determined.

A first or next of the hyperlinks identified in block 204 is selected (block 304). It is determined whether the selected hyperlink was characterized as image or text (block 306). Where the selected hyperlink was characterized as text (block 306), it is determined whether the size of the text divided by the size of text size or the image size of the largest hyperlink characterized in block 302 is less than a defined threshold value (block 308). Said another way, it is determined whether the size of the text is less than a defined percentage (i.e., the defined threshold value) of the size of the largest hyperlink characterized in block 302. In some embodiments, the defined threshold value is twenty percent (20%). In other embodiments, the defined threshold value is ten percent (10%). In some embodiments, the defined threshold value is user programmable.

Where the size of the text is less than the defined threshold (block 308), the selected imbedded hyperlink is identified as a non-focus hyperlink (block 316). When reviewing an electronic message, a recipient's focus is often drawn to the largest information included in message. Thus, any hyperlink included in the electronic message that is substantially smaller than the largest hyperlink in the electronic message is unlikely to be the focus of the recipient, and is assumed to be something that was not intended by the sender of the electronic message to be selected by the recipient. In some cases, the text may be of a size that cannot even be seen by a recipient without significant magnification, and as such would only be selected by accident or by a recipient carefully reviewing a communication. Where a sender is a malicious actor, a malicious hyperlink is intended to be selected by a recipient and as such is likely to be larger in size than other hyperlinks that are included only to divert resources in a security processing system.

Where, on the other hand, the size of the text is not less than the defined threshold (block 308), it is determined whether the text color substantially matches the background color of the electronic message (block 310). As used herein, "a substantial match" in color exists where a similarity in color between the text and the background renders the text invisible to the recipient when displayed on a standard digital display. In some embodiments, "a substantial match" in color occurs where each of the red ("R"), green ("G"), and blue ("B") components in an RGB representation of the color of the text is less than twenty percent (20%) less than the corresponding R, G, and B components in the background color. In some embodiments, "a substantial match" in color occurs where each of the red ("R"), green ("G"), and blue ("B") components in an RGB representation of the color of the text is less than ten percent (10%) less than the corresponding R, G, and B components in the background color. In various embodiments, "a substantial match" in color occurs where two or more of the red ("R"), green ("G"), and blue ("B") components in an RGB representation of the color of the text is less than twenty percent (20%) less than the corresponding R, G, and B components in the background color. In yet other embodiments, "a substantial match" in color occurs where two or more of the red ("R"), green ("G"), and blue ("B") components in an RGB representation of the color of the text is less than ten percent (10%) less than the corresponding R, G, and B components in the background color.

Where the color of the text is a substantial match to the color of the background of the received electronic message (block 310), the selected imbedded hyperlink is identified as a non-focus hyperlink (block 316). When reviewing an electronic message, a recipient's focus is often drawn to hyperlinks that standout against the background of the received electronic message. Thus, any hyperlink included in the electronic message that is substantially the same color as the background of the received electronic message is unlikely to be the focus of the recipient, and is assumed to be something that was not intended by the sender of the electronic message to be selected by the recipient. In some cases, the text color may be identical to that of the background of the received electronic message, and as such cannot be seen by the recipient. Accordingly, such a hyperlink displayed in such a text color would only be selected by accident or by a recipient carefully reviewing a communication. Where a sender is a malicious actor, a malicious hyperlink is intended to be selected by a recipient and as such is likely to be of a color that stands out in relation to the background of the received electronic message.

Alternatively, where the selected hyperlink was characterized as an image (block 306), it is determined whether the size of the image (e.g., number of square pixels) divided by the size of one letter of the text size (e.g., represented as a number of square pixels) or the image size of the largest hyperlink characterized in block 302 is less than a defined threshold value (block 312). Said another way, it is determined whether the size of the image is less than a defined percentage (i.e., the defined threshold value) of the size of the largest hyperlink characterized in block 302. In some embodiments, the defined threshold value is twenty-five percent (25%). In other embodiments, the defined threshold value is fifteen percent (15%). In some embodiments, the defined threshold value is user programmable.

Where the size of the image is less than the defined threshold (block 312), the selected imbedded hyperlink is identified as a non-focus hyperlink (block 316). Again, when reviewing an electronic message, a recipient's focus is often drawn to the largest information included in message. Thus, any hyperlink included in the electronic message that is substantially smaller than the largest hyperlink in the electronic message is unlikely to be the focus of the recipient, and is assumed to be something that was not intended by the sender of the electronic message to be selected by the recipient. In some cases, the image may be of a size that cannot even be seen by a recipient without significant magnification, and as such would only be selected by accident or by a recipient carefully reviewing a communication. Where a sender is a malicious actor, a malicious hyperlink is intended to be selected by a recipient and as such is likely to be larger in size than other hyperlinks that are included only to divert resources in a security processing system.

Where, on the other hand, the size of the image is not less than the defined threshold (block 312), it is determined whether the image color substantially matches the background color of the electronic message (block 314). In some cases, the image color is defined as the average color (e.g., an average of the R, G, B components in each pixel of the image) of the image. As used herein, "a substantial match" in color exists where a similarity in color between the image and the background renders the image invisible to the recipient when displayed on a standard digital display. In some embodiments, "a substantial match" in color occurs where each of the red ("R"), green ("G"), and blue ("B") components in an RGB representation of the color of the image is less than twenty percent (20%) less than the corresponding R, G, and B components in the background color. In some embodiments, "a substantial match" in color occurs where each of the red ("R"), green ("G"), and blue ("B") components in an RGB representation of the color of the image is less than ten percent (10%) less than the corresponding R, G, and B components in the background color. In various embodiments, "a substantial match" in color occurs where two or more of the red ("R"), green ("G"), and blue ("B") components in an RGB representation of the color of the image is less than twenty percent (20%) less than the corresponding R, G, and B components in the background color. In yet other embodiments, "a substantial match" in color occurs where two or more of the red ("R"), green ("G"), and blue ("B") components in an RGB representation of the color of the image is less than ten percent (10%) less than the corresponding R, G, and B components in the background color.

Where the color of the image is a substantial match to the color of the background of the received electronic message (block 314), the selected imbedded hyperlink is identified as a non-focus hyperlink (block 316). Again, when reviewing an electronic message, a recipient's focus is often drawn to hyperlinks that standout against the background of the received electronic message. Thus, any hyperlink included in the electronic message that is substantially the same color as the background of the received electronic message is unlikely to be the focus of the recipient, and is assumed to be something that was not intended by the sender of the electronic message to be selected by the recipient. In some cases, the image color may be identical to that of the background of the received electronic message, and as such cannot be seen by the recipient. Accordingly, such a hyperlink displayed in such an image color would only be selected by accident or by a recipient carefully reviewing a communication. Where a sender is a malicious actor, a malicious hyperlink is intended to be selected by a recipient and as such is likely to be of a color that stands out in relation to the background of the received electronic message.

Where either the color of the text is not a substantial match to the color of the background of the received electronic message (block 310) or the color of the image is not a substantial match to the color of the background of the received electronic message (block 314), it is determined whether another imbedded hyperlink remains to be processed (block 320). Where another imbedded hyperlink remains to be processed (block 320), the next imbedded hyperlink is selected (block 304) and the processes of blocks 306-320 are repeated for the newly selected imbedded hyperlink. Alternatively, where no imbedded hyperlinks remain to be processed (block 320), the process returns to block 212 of FIG. 2.

Turning to FIG. 3B, a flow diagram 350 shows another method in accordance with other embodiments for identifying one or more hyperlinks imbedded in an electronic communication as not part of a recipient's focus of the electronic communication of the electronic message. Following flow diagram 350, each of the hyperlinks identified in block 204 is characterized as: either text or image, size, and color (block 352). In addition, a background color of the electronic message is determined.

A first or next of the hyperlinks identified in block 204 is selected (block 354). It is determined whether the selected hyperlink was characterized as image or text (block 356). Where the selected hyperlink was characterized as text (block 356), it is determined whether the size of the text is less than a defined text size (block 358). In some embodiments, the defined text size is chosen as a size that would be either not visible or ignored because the size is so small. In some cases, the defined text size is four (4) point text. In other cases, the defined text size is six (6) point text. In some embodiments, the defined text size is user programmable.

Where the size of the text is less than the defined text size (block 358), the selected imbedded hyperlink is identified as a non-focus hyperlink (block 366). Again, when reviewing an electronic message, a recipient's focus is often drawn to the largest information included in message. Thus, any hyperlink included in the electronic message that is of a size that is unlikely to be seen in the electronic message is unlikely to be the focus of the recipient, and is assumed to be something that was not intended by the sender of the electronic message to be selected by the recipient. In some cases, the text may be of a size that cannot even be seen by a recipient without significant magnification, and as such would only be selected by accident or by a recipient carefully reviewing a communication. Where a sender is a malicious actor, a malicious hyperlink is intended to be selected by a recipient and as such is likely to be larger in size than other hyperlinks that are included only to divert resources in a security processing system.

Where, on the other hand, the size of the text is not less than the defined text size (block 358), it is determined whether the text color substantially matches the background color of the electronic message (block 360). Where the color of the text is a substantial match to the color of the background of the received electronic message (block 360), the selected imbedded hyperlink is identified as a non-focus hyperlink (block 366). Again, when reviewing an electronic message, a recipient's focus is often drawn to hyperlinks that standout against the background of the received electronic message. Thus, any hyperlink included in the electronic message that is substantially the same color as the background of the received electronic message is unlikely to be the focus of the recipient, and is assumed to be something that was not intended by the sender of the electronic message to be selected by the recipient. In some cases, the text color may be identical to that of the background of the received electronic message, and as such cannot be seen by the recipient. Accordingly, such a hyperlink displayed in such a text color would only be selected by accident or by a recipient carefully reviewing a communication. Where a sender is a malicious actor, a malicious hyperlink is intended to be selected by a recipient and as such is likely to be of a color that stands out in relation to the background of the received electronic message.

Alternatively, where the selected hyperlink was characterized as an image (block 356), it is determined whether the size of the image (e.g., number of square pixels) is less than a defined image size (block 362). In some embodiments, the defined image size is sixty-four (64) square pixels. In other embodiments, the defined image size is sixteen (16) square pixels. In some embodiments, the defined image size is user programmable.

Where the size of the image is less than the defined image size (block 362), the selected imbedded hyperlink is identified as a non-focus hyperlink (block 366). Again, when reviewing an electronic message, a recipient's focus is often drawn to the largest information included in message. Thus, any hyperlink included in the electronic message that is of a size that is likely to be ignored by a recipient, it is assumed to be something that was not intended by the sender of the electronic message to be selected by the recipient. In some cases, the image may be of a size that cannot even be seen by a recipient without significant magnification, and as such would only be selected by accident or by a recipient carefully reviewing a communication. Where a sender is a malicious actor, a malicious hyperlink is intended to be selected by a recipient and as such is likely to be larger in size than other hyperlinks that are included only to divert resources in a security processing system.

Where, on the other hand, the size of the image is not less than the defined image size (block 362), it is determined whether the image color substantially matches the background color of the electronic message (block 364). In some cases, the image color is defined as the average color (e.g., an average of the R, G, B components in each pixel of the image) of the image. As used herein, "a substantial match" in color exists where a similarity in color between the image and the background renders the image invisible to the recipient when displayed on a standard digital display. In some embodiments, "a substantial match" in color occurs where each of the red ("R"), green ("G"), and blue ("B")

components in an RGB representation of the color of the image is less than twenty percent (20%) less than the corresponding R, G, and B components in the background color. In some embodiments, "a substantial match" in color occurs where each of the red ("R"), green ("G"), and blue ("B") components in an RGB representation of the color of the image is less than ten percent (10%) less than the corresponding R, G, and B components in the background color. In various embodiments, "a substantial match" in color occurs where two or more of the red ("R"), green ("G"), and blue ("B") components in an RGB representation of the color of the image is less than twenty percent (20%) less than the corresponding R, G, and B components in the background color. In yet other embodiments, "a substantial match" in color occurs where two or more of the red ("R"), green ("G"), and blue ("B") components in an RGB representation of the color of the image is less than ten percent (10%) less than the corresponding R, G, and B components in the background color.

Where the color of the image is a substantial match to the color of the background of the received electronic message (block 364), the selected imbedded hyperlink is identified as a non-focus hyperlink (block 366). Again, when reviewing an electronic message, a recipient's focus is often drawn to hyperlinks that standout against the background of the received electronic message. Thus, any hyperlink included in the electronic message that is substantially the same color as the background of the received electronic message is unlikely to be the focus of the recipient, and is assumed to be something that was not intended by the sender of the electronic message to be selected by the recipient. In some cases, the image color may be identical to that of the background of the received electronic message, and as such cannot be seen by the recipient. Accordingly, such a hyperlink displayed in such an image color would only be selected by accident or by a recipient carefully reviewing a communication. Where a sender is a malicious actor, a malicious hyperlink is intended to be selected by a recipient and as such is likely to be of a color that stands out in relation to the background of the received electronic message.

Where either the color of the text is not a substantial match to the color of the background of the received electronic message (block 360) or the color of the image is not a substantial match to the color of the background of the received electronic message (block 364), it is determined whether another imbedded hyperlink remains to be processed (block 370). Where another imbedded hyperlink remains to be processed (block 370), the next imbedded hyperlink is selected (block 354) and the processes of blocks 356-370 are repeated for the newly selected imbedded hyperlink. Alternatively, where no imbedded hyperlinks remain to be processed (block 370), the process returns to block 212 of FIG. 2.

Returning to FIG. 2, it is determined whether the recipient focus is insubstantial in light of the identified non-focus hyperlinks of the received electronic message (block 212). In some embodiments, this determination is made by dividing the number of hyperlinks that were identified as non-focus hyperlinks (from block 210) by the total number of hyperlinks included in the received electronic message to yield a ratio of non-focus hyperlinks in accordance with the following equation:

$$\text{Ratio of Non-focus hyperlinks} = \text{Number of Non-focus hyperlinks}/\text{Total Number of Hyperlinks}.$$

This ratio is compared with a defined threshold, and where it exceeds the defined threshold the recipient focus is considered to be insubstantial in light of the identified non-focus hyperlinks of the received electronic message. In some embodiments, the defined threshold is 0.8. In other embodiments, the define threshold is 0.6. In some embodiments, the defined threshold is user programmable.

In alternative embodiments (not shown) block 212 is simplified such that it only compares the total number of hyperlinks in the received electronic message with a defined threshold. In such a case, the recipient focus in electronic messages with a number of hyperlinks that exceeds the defined threshold is considered to be insubstantial in light of the identified non-focus hyperlinks. In yet other alternative embodiments (not shown) block 212 is simplified such that it only compares the total number of non-focus hyperlinks in the received electronic message with a defined threshold. In such a case, the recipient focus in electronic messages with a number of non-focus hyperlinks that exceeds the defined threshold is considered to be insubstantial in light of the identified non-focus hyperlinks.

Where either it is determined that the recipient focus is not insubstantial in light of the identified non-focus hyperlinks of the received electronic message (block 212), the non-focus hyperlinks are removed from the received electronic message to yield a modified electronic message (block 214). In some embodiments, such removal includes completely deleting each of the non-focus hyperlinks so that they cannot be seen by a recipient even after highlighting and/or magnification. In other embodiments, such removal includes re-writing the hyperlink with click protection rendering the hyperlink inoperable, but leaving the image or text that represented the hyperlink. As such, the inoperable hyperlink remains, and could potentially be seen by a recipient after highlighting and/or magnification.

The hyperlinks in the modified electronic message that were not identified as non-focus hyperlinks are processed using one or both of a web filtering process and/or a sandbox process as are known in the art (block 216). In some embodiments, only a sandbox process is used where the website associated with the particular hyperlink is accessed in a controlled environment (i.e. a sandbox) and investigated. Where the website is found to be potentially malicious, the hyperlink is identified as unsafe. In other embodiments, only a web filter process is used where a URL for the website associated with the particular hyperlink is compared against a database of known malicious websites. Where a match is found to a known malicious website, the website is found to be potentially malicious and the hyperlink is identified as unsafe. In yet other embodiments, a tiered approach is used to first check each of the hyperlinks using the aforementioned web filter process, and where that indicates all hyperlinks are safe a sandbox process is applied.

In some cases, the processing using either of or a combination of the web filtering and the sandbox only continues until one hyperlink is found to be associated with a potentially malicious website at which time the processing ends. By limiting the processing to finding only a single potential threat processing resources are saved and latency is reduced. Where all of the hyperlinks are found to be safe (block 218), the modified electronic message is forwarded to the recipient (block 220).

Where either it is determined that the recipient focus is insubstantial in light of the identified non-focus hyperlinks of the received electronic message (block 212) or the sandbox/web filter process(es) indicated that one or more of the scrutinized hyperlinks is potentially malicious (block 218), the received electronic communication is rejected. Such a rejection may include, for example, quarantining and forwarding for additional processing (block 222). The quarantining and further processing may be any quarantining and/or further processing known in the art for processing electronic messages that have been identified as potentially malicious. As an example, the quarantining and/or further processing may include removing unsafe hyperlinks, re-writing unsafe hyperlinks to render them inoperable, or otherwise neutralizing the unsafe hyperlinks.

Turning to FIG. 4, a flow diagram 400 shows a method in accordance with various embodiments for efficiently applying security processing to a received email that includes one or more hyperlinks. Following flow diagram 400, it is determined whether an email has been received (block 402). This determination may be made by any approach known in the art. For example, a determination as to whether an electronic message has been received may include, but is not limited to, identifying features in a received network communication that are indicative of an email such as, for example, use of the @ sign. Based upon the disclosure provided herein, one of ordinary skill in the art will recognize a variety of approaches that may be used to determine that an email has been received.

Where an email has been received (block 402), the received email is parsed to identify any imbedded hyperlinks (block 404). Any approach known in the art for identifying an imbedded hyperlink may be used in accordance with different embodiments. As an example, the email may be parsed to identify one of more of the terms "href", "http:", or "https:". Where the term is found, the uniform record locator ("URL") associated therewith is stored as a hyperlink. Thus, for example, where an email includes the following:

Standard hyperlink: <a href=https:// www.fortinet.com>The Fortinet website</a>, the www.fortinet.com is stored as a hyperlink. In some embodiments, identifying the hyperlinks is done using Forti-Mail™. In some cases, the hyperlinks may include a URL that is directed to a website that does not exist. Examples of such "null" hyperlinks follow:

null-string hyperlink: <a href=https://www.fortinet-.com></a>, or

<a href="https://"></a>.

Such "null" hyperlinks may be used by a malicious actor to force a security program to scrutinize meaningless hyperlinks in an effort to avoid scrutiny of a malicious hyperlink found later in the received email as described above. Based upon the disclosure provided herein, one of ordinary skill in the art will recognize a variety of approaches that may be used in relation to different embodiments to identify hyperlinks in a received email.

It is determined whether no hyperlinks (i.e., zero hyperlinks) were identified in the received email (block 406). Where no hyperlinks were identified (block 406), the email is forwarded to the identified recipient without modification (block 408). It is noted that in some cases, instead of forwarding the email, it may be subject to other security processing in accordance with established security processing rules for the particular type of email.

Alternatively, where at least one hyperlink was identified (block 406), the first/next imbedded hyperlink is selected (block 410). The visibility of the selected hyperlink is determined based upon the size and/or color of the hyperlink (block 412). This process may be done similar to that discussed above in relation to elements 308, 310, 312, 314 of FIG. 3A and/or elements 358, 360, 362, 364 of FIG. 3B.

Where it is found that the selected hyperlink is not visible (block 414), a security process is applied to the invisible hyperlink to yield a modified email (block 422). This security process may include, but is not limited to, removing the hyperlink from the received email so that it cannot be seen by a recipient even after highlighting and/or magnification. Alternatively, the security process may include, but is not limited to, re-writing the hyperlink with click protection rendering the hyperlink inoperable, but leaving the image or text that represented the hyperlink. As such, the inoperable hyperlink remains, and could potentially be seen by a recipient after highlighting and/or magnification.

Alternatively, where it is found that the selected hyperlink is visible (block 414), the selected hyperlink is processed using one or both of a web filtering process and/or a sandbox process as are known in the art (block 416). In some embodiments, only a sandbox process is used where the website associated with the particular hyperlink is accessed in a controlled environment (i.e. a sandbox) and investigated. Where the website is found to be potentially malicious, the hyperlink is identified as unsafe. In other embodiments, only a web filter process is used where a URL for the website associated with the particular hyperlink is compared against a database of known malicious websites. Where a match is found to a known malicious website, the website is found to be potentially malicious and the hyperlink is identified as unsafe. In yet other embodiments, a tiered approach is used to first check each of the hyperlinks using the aforementioned web filter process, and where that indicates all hyperlinks are safe a sandbox process is applied.

Where the process(es) of sandboxing and/or web filtering indicate that the selected hyperlink is safe (block 418) or once the security processes have been applied to an invisible hyperlink (block 422), it is determined whether another imbedded hyperlink in the email remains to be processed (block 424). Where another imbedded hyperlink remains to be processed (block 424) the next imbedded hyperlink is selected (block 410) and the processes of blocks 412-424 are repeated. Where no imbedded hyperlinks in the email remain for processing (block 424), the modified email is forwarded to the recipient (block 426).

Alternatively, where the process(es) of sandboxing and/or web filtering indicate that the selected hyperlink is not safe (block 418), the received email is rejected. Such a rejection may include, for example, quarantining and forwarding for additional processing (block 420). The quarantining and further processing may be any quarantining and/or further processing known in the art for processing emails that have been identified as potentially malicious. As an example, the quarantining and/or further processing may include removing unsafe hyperlinks, re-writing unsafe hyperlinks to render them inoperable, or otherwise neutralizing the unsafe hyperlinks.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A computer-implemented method, the method comprising:

identifying, by a processing resource, a set of hyperlinks in a received electronic message;

automatically determining, by the processing resource, that a first hyperlink in the set of hyperlinks comprises a non-focus hyperlink relative to the set of hyperlinks, by determining, at least in part, that the first hyperlink is not visually distinct from the received electronic message;

automatically determining, by the processing resource, that a second hyperlink in the set of hyperlinks comprises a focus hyperlink relative to the set of hyperlinks, by determining, at least in part, that the first hyperlink is visually distinct from the received electronic message; and applying, by the processing resource, a security process concerning at least the first hyperlink or the second hyperlink.

2. The method of claim 1, the method further comprising:

forwarding, by the processing resource, the modified electronic message to a recipient based at least in part upon a determination that the second hyperlink is not associated with a malicious website.

3. The method of claim 1, wherein the electronic message is selected from a group consisting of: an email, and a text message.

4. The method of claim 1, wherein applying the security process to the second hyperlink includes performing a web filter process wherein a uniform record locator associated with the second hyperlink is compared with a plurality of known malicious websites.

5. The method of claim 4, wherein the web filter process indicates that the second hyperlink is safe, and wherein applying the security process to the second hyperlink further includes applying a sandbox process to the second hyperlink that accesses a website associated with the second hyperlink to determine a malicious status of the website.

6. The method of claim 1, wherein the determining that the first hyperlink in the set of hyperlinks is a non-focus hyperlink includes:

determining, by the processing resource, a size of the first hyperlink;

comparing, by the processing resource, the size of the first hyperlink with a defined size; and identifying, by the processing resource, the first hyperlink as a non-focus hyperlink when the size of the first hyperlink is less than the defined size.

7. The method of claim 6, wherein the first hyperlink is represented as text, and wherein the size of the first hyperlink is a font size of one character of the first hyperlink.

8. The method of claim 6, wherein the first hyperlink is represented as an image, and wherein the size of the first hyperlink is a number of pixels squares of the image.

9. The method of claim 1, wherein the determining that the first hyperlink in the set of hyperlinks is a non-focus hyperlink includes:

determining, by the processing resource, a color of the first hyperlink;

comparing, by the processing resource, the color of the first hyperlink with a background color of the received electronic message; and identifying, by the processing resource, the first hyperlink as a non-focus hyperlink when the color of the first hyperlink is less than twenty percent different that the background color of the received electronic message.

10. The method of claim 1, wherein the determining that the first hyperlink in the set of hyperlinks is a non-focus hyperlink includes:

determining, by the processing resource, a size of the first hyperlink and a maximum size of any hyperlink in the set of hyperlinks;

comparing, by the processing resource, the size of the first hyperlink with the maximum size of any hyperlink in the set of hyperlinks; and identifying, by the processing resource, the first hyperlink as a non-focus hyperlink when the size of the first hyperlink is less than a defined ratio of the first hyperlink to the maximum size.

11. The method of claim 10, wherein the defined threshold is less than 0.4.

12. The method of claim 1, the method further comprising:

rejecting, by the processing resource, the modified electronic message based at least in part upon a determination that the second hyperlink is associated with a malicious website.

13. The method of claim 1, the method further comprising:

rejecting, by the processing resource, the received electronic message when a characteristic of the electronic message is determined, wherein the characteristic of the electronic message is selected from a group consisting of:

a total number of hyperlinks included in the set of hyperlinks exceeds a defined threshold; and a ratio of a number of hyperlinks determined to be non-focus hyperlinks to the total number of hyperlinks included in the set of hyperlinks exceeds a defined ratio.

14. A non-transitory computer-readable storage medium embodying a set of instructions, which when executed by a processing resource, causes the processing resource to:

identify a set of hyperlinks in a received electronic message;

automatically determine that a first hyperlink in the set of hyperlinks comprises a non-focus hyperlink relative to the set of hyperlinks, by determining, at least in part, that the first hyperlink is not visually distinct from the received electronic message;

automatically determine, by the processing resource, that a second hyperlink in the set of hyperlinks comprises a focus hyperlink relative to the set of hyperlinks, by determining, at least in part, that the first hyperlink is visually distinct from the received electronic message; and apply a security process to concerning at least the first hyperlink or the second hyperlink.

15. The non-transitory computer-readable storage medium of claim 14, wherein the set of instructions, when executed by the processing resource, further causes the processing resource to:

forward the modified electronic message to a recipient based at least in part upon a determination that the second hyperlink is not associated with a malicious website.

16. The non-transitory computer-readable storage medium of claim 14, wherein applying the security process to the second hyperlink includes performing a web filter process wherein a uniform record locator associated with the second hyperlink is compared with a plurality of known malicious websites.

17. The non-transitory computer-readable storage medium of claim 16, wherein the web filter process indicates that the second hyperlink is safe, and wherein applying the security process to the second hyperlink further includes applying a sandbox process to the second hyperlink that accesses a website associated with the second hyperlink to determine a malicious status of the website.

18. The non-transitory computer-readable storage medium of claim 14, wherein determining that the first hyperlink in the set of hyperlinks is a non-focus hyperlink includes:

determining a size of the first hyperlink;

comparing the size of the first hyperlink with a defined size; and identifying the first hyperlink as a non-focus hyperlink when the size of the first hyperlink is less than the defined size.

19. The non-transitory computer-readable storage medium of claim 14, wherein determining that the first hyperlink in the set of hyperlinks is a non-focus hyperlink includes:

determining a color of the first hyperlink;

comparing the color of the first hyperlink with a background color of the received electronic message; and identifying the first hyperlink as a non-focus hyperlink when the color of the first hyperlink is less than twenty percent different that the background color of the received electronic message.

20. The non-transitory computer-readable storage medium of claim 14, wherein determining that the first hyperlink in the set of hyperlinks is a non-focus hyperlink includes:

determining a size of the first hyperlink and a maximum size of any hyperlink in the set of hyperlinks;

comparing the size of the first hyperlink with the maximum size of any hyperlink in the set of hyperlinks; and identifying the first hyperlink as a non-focus hyperlink when the size of the first hyperlink is less than a defined ratio of the first hyperlink to the maximum size.

21. A system for performing network security, the system comprising:

a processing resource;

a non-transitory computer-readable medium, coupled to the processing resource, having stored therein instructions that when executed by the processing resource cause the processing resource to:

identify a set of hyperlinks in a received electronic message;

automatically determine that a first hyperlink in the set of hyperlinks comprises a non-focus hyperlink relative to the set of hyperlinks, by determining, at least in part, that the first hyperlink is not visually distinct from the received electronic message;

automatically determine, by the processing resource, that a second hyperlink in the set of hyperlinks comprises a focus hyperlink relative to the set of hyperlinks, by determining, at least in part, that the first hyperlink is visually distinct from the received electronic message; and apply a security process concerning at least the first hyperlink or the second hyperlink.

* * * * *